United States Patent [19]

Johnstun

[11] 4,198,451

[45] Apr. 15, 1980

[54] MARKER LAYUP

[76] Inventor: Dick E. Johnstun, 27472 Via Olmo, Mission Viejo, Calif. 92691

[21] Appl. No.: 23,594

[22] Filed: Mar. 26, 1979

[51] Int. Cl.$^2$ ............................ B32B 1/08; B32B 3/16

[52] U.S. Cl. ........................................ 428/36; 428/202; 428/294; 428/421; 428/523

[58] Field of Search ...................... 282/14, 19 R, 28 R, 282/28 A; 427/153; 428/35, 36, 195, 201, 202, 211, 537, 913, 914, 421, 422, 522, 523, 294, 295

[56] References Cited

U.S. PATENT DOCUMENTS

| | | | |
|---|---|---|---|
| 3,924,879 | 12/1975 | Wright | 282/28 R |
| 3,973,788 | 8/1976 | Pekko et al. | 282/28 R |

*Primary Examiner*—Bruce H. Hess
*Attorney, Agent, or Firm*—William H. Maxwell

[57] ABSTRACT

A layup of sheet material and flattened heat shrink tubing to be processed in a typewriter in the usual manner with said tubing releasably held in alignment by adhesive and/or removable tapes and exposed so as to be imprinted with indicia and individually cut to length and subsequently applicable to the end portions of wiring to identify the same.

12 Claims, 6 Drawing Figures

MARKER LAYUP

BACKGROUND

Marker assemblies for labeling are well known, and especially the marking of shrink tubing to be applied to electrical wiring whereby identification can be made in the form of characters imprinted thereon. A widely used machine for imprinting characters is the typewriter, heretofore used to print upon marker assemblies comprised of heat shrink tubing held flat over cores or fillers inserted therein to substantially occupy the interior thereof preparatory to the imprinting of characters thereon. However, the insertion of cores and fillers has its limitations and special requirements in the typewriter construction. Firstly, the shrink tubing is limited in length, and secondly the typewriter platen must be specially adapted to the reception of the marker assembly with provision to drive the same. Therefore, it is a general object of this invention to provide a marker layup for reception into a typewriter without modification thereto and for the application of indicia upon the shrink tubing, to be used by technicians in permanently identifying electrical conductors.

This invention is concerned with the imprinting of indicia onto markers to be applied over the ends of electrical wiring that requires identification. It is thin walled (0.010 inch) cross linked polymer tubing or the like, with which this invention is concerned, and which is available in soft initially cured roll form of large cross-sectional diameter, and which is to be subjected to subsequent heat curing that reduces its diameter for constriction onto the wires to be identified, as circumstances require. The opacity and/or color of the tubing can vary, a white opaque tubing being widely employed. A problem arises in the imprinting of indicia onto such tubing, the roundness or cylindrical convexity making it difficult to imprint complete legible characters thereon. Heretofore, flattened cores or fillers have been inserted therein, but this process is restrictive whereas I have discovered that a partial shrink of the tubing while held flattened and through the application of controlled heat will harden the tubing sufficiently so that it will remain flat and pliable and conducive to being laminated for insertion into a typewriter in the usually intended fashion. With the present invention, continuous lengths of flattened shrink tubing can be produced, and cut to any length desired. In practice therefore, the shrink tubing is cut to a length to occupy the full width of a layup into which it is incorporated, said width being limited only by the length of the platen and/or typewriter carriage. In carrying out this invention, a plurality of flattened marker tubes are incorporated into a single layup.

The imprinting of indicia onto plastic material is widely employed, and typewriters are available for this purpose, utilizing ribbon or tape (film) with pressure transferable material thereon which is applied by pressure onto said plastic surface. These transfer materials are well known and are referred to generally as ink or carbon, or simply "carbon". It is an object therefore, to utilize such a film or carbon tape as it is supplied for ordinary typewriters. It is also an object to layup a traction sheet with one or more and preferably a plurality of shrink tubing sections held in alignment for imprinting utilizing conventional procedure therefor. With the present invention, the plurality of lengths of shrink tubing run from margin to margin, held in place to traction sheet. Therefore, the front face of the manifold is typed upon in the usual manner for correct reading, the characters being transferred directly from the typewriter ribbon or tape and onto the exposed shrink tubing. In practice, the tubing attachment can be perforated so that the tubing can be torn off and sequentially removed in lengths as required.

It is an object of this invention to provide a layup of the character referred to wherein available materials are employed, processed as described herein and cooperatively joined into a combination wherein a plurality of markers can be imprinted in an ordinary typewriter and subsequently removed and shrunk onto wires to be identified. The margins of the shrink tubing can be joined to the traction sheet by adhesive, releasable pressure adhesive of the type used for making removable tapes and the like, and all of which is sufficient to retain the integrity of the layup and to ensure proper alignment of the lengths of shrink tubing thereon.

SUMMARY OF INVENTION

This invention is concerned with the application of indicia to shrink tubing, and requires a flattened form thereof for insertion into a typewriter and held adjacent to the platen thereof for normal printing operations. Accordingly, the shrink tubing is flattened and cut to length, and a plurality thereof is arranged to extend between the side margins of a traction sheet upon which they are removably incorporated and retained by a releasable means. There is a friction coating applied to the traction sheet for its utilitarian use with and cooperative engagement with the roller platen of the typewriter. Alignment and sequential removal of the individual tubing lengths is a feature.

DRAWINGS

The various objects and features of this invention will be fully understood from the following detailed description of the typical preferred forms and applications thereof, throughout which description reference is made to the accompanying drawings, in which.

PREFERRED EMBODIMENT

Figure 1:
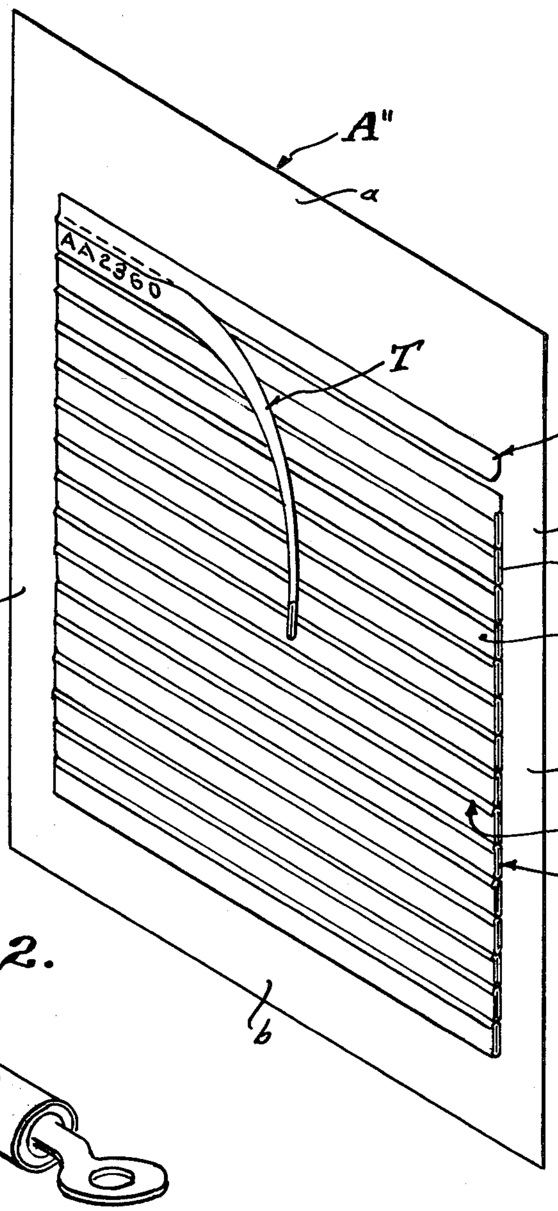
FIG. 1 is a perspective view of the layup with the flattened shrink tubing attached by tapes adhered to the traction sheet.
Figure 6:
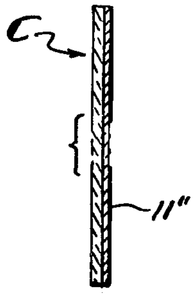
FIG. 6 is an enlarged sectional view of the attachment tape thereof used in FIG. 1.

The usual typewriter is a mahine for imprinting characters upon a sheet of paper, or in this case plastic material, and comprises a platen to back the impression of the type with an intervening carbon film or tape that leaves a visible impression. There are vairations in the machine design of typewriters, and the roll type of platen is universally employed for the reception of and line by line transport of the sheet upon which the printing is to be applied. It has been common practice to manifold sheets of paper in a typewriter, but there is a practical limit to the thickness of such a manifold. Accordingly, it is a general object herein to provide a marker layup that is within the practical range of thickness and with frictional engagement that does not require any special drive or any modification of the typewriter platen. With the present invention, the flattened lengths of shrink tubing lie adjacent to each other and the plurality thereof is arranged for normal smooth operation through the typewriter machine.

This marker layup is provided for the preparation of shrink tubing, prior to its constriction onto wire ends by curing with the application of heat. It is a cross linked polymer tubing in its partially cured state that is employed herein, two examples of which are irradated and thermally stabilized modified polyvinylidene fluoride or polyolefin compound. The tubing is preformed from its initial circular cross section into a flattened condition by restricted application of controlled heat that advances the curing thereof for release of a portion of its memory and hardening the same into a constrained flattened configuration. In carrying out this invention, the initial thin walled plastic tubing is immersed in a heated liquid such as water and simultaneously compressed between turning rollers to flatten the same. This method is a continuous process followed by constrainment of the heat shrink tubing in a flattened condition while it cools after removal from the heated liquid, whereby the flattness thereof is retained. In practice, various sized tubing is employed, for example ¼ inch tubing having a wall thickness of 0.010 inch and immersed in 200° F. water a few seconds (approximations).

Referring now to the drawings, there is generally, a rectangular traction sheet A and over which there is a transversely disposed length of flattened shrink tubing T. The sheet and tubing are cooperatively joined by releasable adhesive as will be described, and all of which establishes the marker layup for normal insertion into a typewriter, for alignment of the marker tubes T to receive imprinted indicia with accuracy.

The layup is of "letter size" as shown and for purpose of example, although it can be of any or greater size as desired and capable of reception by the platen of the typewriter to be employed. Accordingly, the traction sheet A is for example 8½×11 inches with normal top a, bottom b and side margins C as shown. The top and bottom margins can be 1½ and 1 inch respectively, and the side margins ¾ inch respectively, in which case the transverse distance between the marginal portions is 7 inches. The flattened ¼ inch tubing is approximately ⅜ inch in width, so that twenty-four 7 inch lengths of marker tubes T can be accommodated within the margins described (FIG. 1 illustrates twelve lengths of larger marker tube T).

Figure 3:
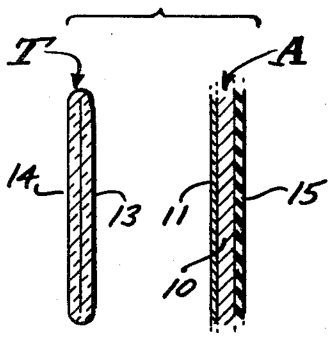
FIG. 3 is an exploded sectional view showing the layup of the traction sheet and flattened shrink tubing.

In one form FIG. 3, the traction sheet A is a flat sheet of 0.004 inch paper 10 with a layer of releasable pressure adhesive 11 applied coextensively to the top side thereof, an adhesive that will releasably hold to a plastic polymer such as that comprising the shrink tubing T.

Figure 4:
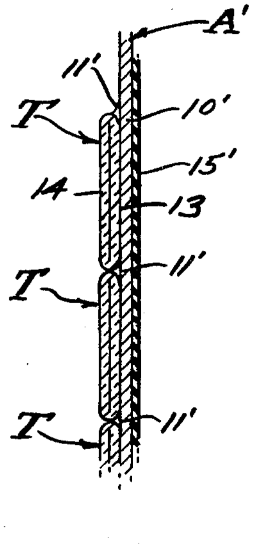
FIG. 4 is an assembled fragmentary sectional view through a second form of the invention and FIG. 5 is an assembled fragmentary sectional view through a third and preferred form of the invention.

In another form FIG. 4, the traction sheet A' is a flat sheet of 0.004 inch paper 10' with a bead of releasable pressure adhesive 11' applied thereto along the lines of joinder between the edges of adjacent tubes T, an adhesive having body analogous to putty and that will occupy the interstice and adhere to the front face of the paper 10' between adjacent tubes and releasably hold to a plastic polymer such as that comprising the shrink tubing T.

Figure 5:
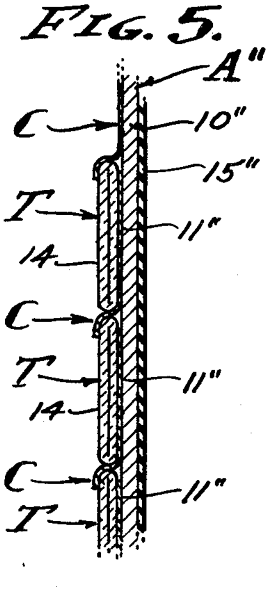

In still another and the preferred form FIG. 5, the traction sheet A" is a flat sheet of 0.004 inch paper 10" combined with a tape C attached between the paper 10" and tubes T by means of a releasable pressure adhesive 11" applied coextensively to one side of the tape, an adhesive that will releasably hold to a plastic polymer such as that comprising the shrink tubing T. A feature shown in FIG. 5 is the over-under lap of the tape C as it extends over the upper edge of one tube T to attach the same to the paper 10" beneath the lower margin of the next adjacent tube T. Accordingly, there is a "shingled" relationship which is significantly advantageous when drawing the tubes sequentially into positioned alignment for imprinting in the typewriter. It is the pulling of each tube into position by this attachment to its upper edge, coextensively therewith, and by its attachment to the traction sheet A" driven by the platen roller as next described.

In accordance with this invention the necessary frictional engagement of this layup with the roller platen of the typewriter is by means of a cover coating 15 applied longitudinally of the back thereof, for example a rubber base material applied in a dry thin layer (not tacky) and which forms a "non-skid" surface that will not slip with respect to the surface of the platen engageably advancing the layup to position the same. The coating 15 can be applied as one or more strips, or coextensively over the back side of the backing lamina A to maximize the coefficient of friction.

The assembly process requires the orientation and pressure application of a plurality of marker tubes T, arranged as hereinabove stated and in flattened condition as described. The marker tubes T are cut to equal length with normal ends 12 and with the bottom sides 13 engaged with the traction sheet and/or adhered thereto by pressure adhesive (11, 11' or 11") and with the top sides 14 exposed at the front of the layup, the number of tubes being placed side by side parallel and adjacent one to the other.

In accordance with this invention, the precise placement of the marker tubes T extending transversely over the traction sheet A is coordinated with the typed indicia to be applied by the typewriter. Therefore, each line of marker tube adjacency indicates a line disposed transversely of the front of the layup across the top face of the layup between the side marginal portions thereof. A feature is that the flattened tubes are separable along said lines.

Figure 2:
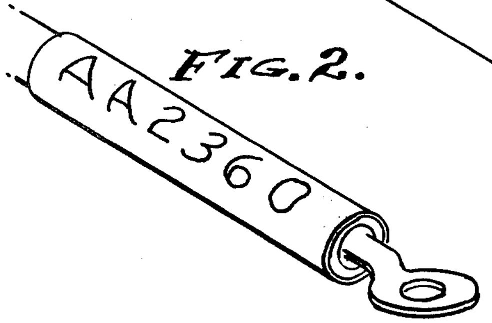
FIG. 2 is a perspective view illustrating the application of imprinted shrink tubing cut to a shorter length and constricted over a wire end to be identified.

From the foregoing it will be seen that the marker layup is flexible and pliable in all directions the same as a manifold of papers, thereby to be manipulated into a typewriter in the usual manner. Accurate alignment of the marker tubes T is made possible by the adjacency thereof and adjustment to the lines 17, whereby the indicia is centered on the top side 14 thereof. Each impression is immediately visible on the top side 14 of the marker tube, and removal of the marker tube T is facilitated by tearing off each as may be required to expose the marker tube or tubes for removal, by stripping them from the releasable adhesive or tape on the top face of the traction sheet A. The individual imprinted marker strips are then peeled out and cut into sections as required and opened by manipulation and slipped over wire ends and heat applied for constriction into final working position (see FIG. 2). The marker layup can be used up one or more marker tubes T at a time, and packaged and stored flat with no danger of damage by distortion.

Having described only the typical preferred forms and applications of my invention, I do not wish to be limited or restricted to the specific details herein set forth, but wish to reserve to myself any modifications or variations that may appear to those skilled in the art as set forth within the limits of the following claims:

I claim:

1. A layup for insertion of heat shrink marker tubes through a typewriter and driven by the platen thereof and into alignment to receive type imprints via a typewriter ribbon/tape transferring indicia onto the marker tubes, and consisting of;
  - a flexible traction sheet of rectangular form and having marginal portions,
  - a cover coating comprised of a thin layer of friction material extending longitudinally of the back of the traction sheet,
  - a plurality of flexible marker tubes of partially cured cross-linked polymer tubing hardened into a constrained flattened configuration and with adjacent edges and extending transversely over the front of the traction sheet and exposed to the typewriter type and typewriter ribbon/tape between said marginal portions, and
  - a releasable pressure adhesive securing the marker tubes to the front of the traction sheet.

2. The layup for marker tubes as set forth in claim 1, wherein the cross linked polymer of said plurality of marker tubes is polyvinylidene fluoride hardened into said constrained flattened configuration.

3. The layup for marker tubes as set forth in claim 1, wherein the cross linked polymer of said plurality of marker tubes is modified polyolefin hardened into said constrained flattened configuration.

4. The layup for marker tubes as set forth in claim 1, wherein the cover coating at the back of the traction sheet is substantially coextensive thereof.

5. The layup for marker tubes as set forth in claim 1, wherein the cover coating at the back of the traction sheet is a polymer film whereby traction is maximized with the typewriter platen of similar material.

6. The layup for marker tubes as set forth in claim 1, wherein the front of the traction sheet is coextensively coated between said margins with said releasable pressure adhesive for securement of the plurality of marker tubes.

7. The layup for marker tubes as set forth in claim 1, wherein beads of said releasable pressure adhesive engageably underlie the edges of the adjacent marker tubes and are attached to the traction sheet for positioned securement of the marker tubes.

8. The layup for marker tubes as set forth in claim 1, wherein said releasable pressure adhesive is on a tape overlying and adhered to one tube and underlying the next adjacent tube where it is adhered to the traction sheet.

9. The layup for marker tubes as set forth in claim 1, wherein said releasable pressure adhesive is on a tape overlying and removably adhered to one tube and underlying the next adjacent tube where it is permanently adhered to the traction sheet.

10. The layup for marker tubes as set forth in claim 1, wherein said releasable pressure adhesive is on a tape overlying the top edge of and adhered to one tube and underlying the bottom edge of the next adjacent tube where it is adhered to the traction sheet.

11. The layup for marker tubes as set forth in claim 1, wherein said releasable pressure adhesive is on a tape overlying the top edge of and removably adhered to one tube and underlie the bottom edge of the next adjacent tube where it is permanently adhered to the traction sheet.

12. The layup for marker tubes as set forth in claim 1, wherein the cover coating at the back of the traction sheet is a polymer film whereby traction is maximized with the typewriter platen of similar material, and wherein said releasable pressure adhesive is on a tape overlying the top edge of and removably adhered to one tube and underlying the bottom edge of the next adjacent tube where it is permanetly adhered to the traction sheet.

* * * * *